Patented July 7, 1942

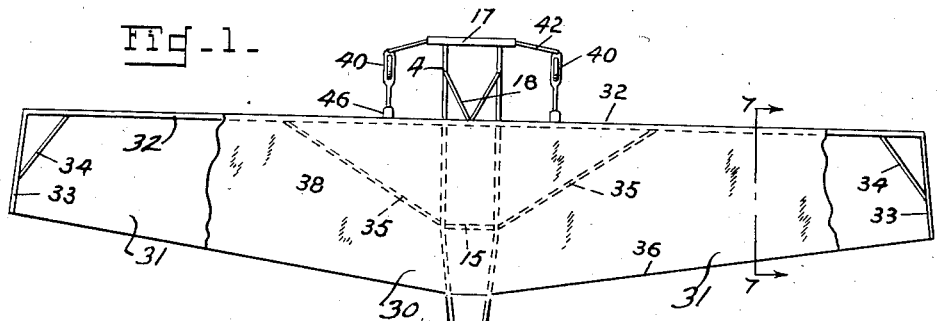

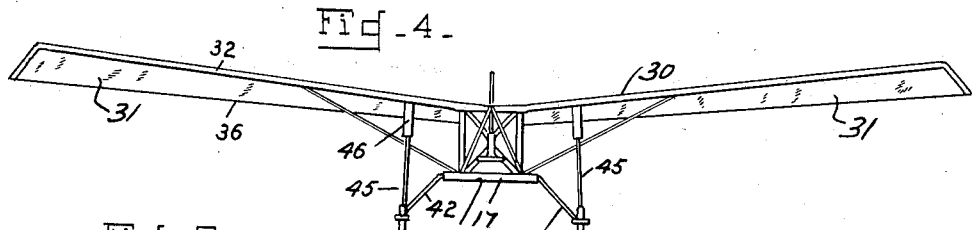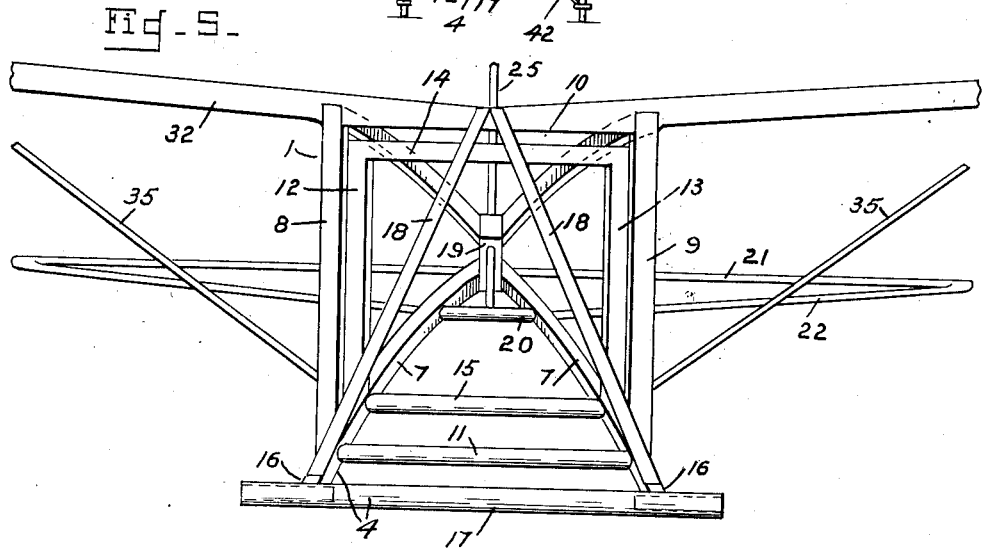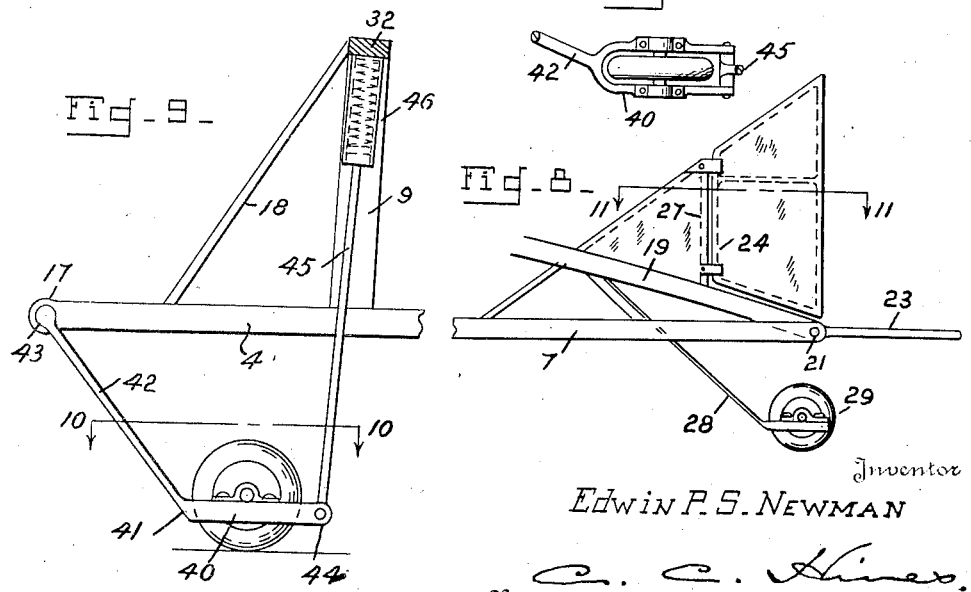

2,288,829

UNITED STATES PATENT OFFICE 2,288,829

AIRPLANE

Edwin P. S. Newman, Washington, D. C.

Application July 6, 1939, Serial No. 283,018

8 Claims. (Cl. 244—13)

This invention relates to improvements in airplanes, and has special reference to the provision of an airplane which is light in weight, simple, strong and durable in construction, and capable of being driven at satisfactory speed by a low-powered motor, so that the machine may be built, sold and operated at a comparatively low cost, and which is to a high degree autostable or inherently self-balancing as against forces tending to cause it to assume unstable positions and adapted to be operated with a high degree of safety when encountering disturbing wind pressures or subjected to other disturbing factors.

One object of the invention is to provide an airplane having these desirable characteristics.

Another object of the invention is to provide a wing and tail construction and balancing arrangement of the same and the body or fuselage of the airplane whereby a larger area of supporting surface is afforded, greater inherent stability obtained and the wings adapted to shed disturbing pressures tending to cause instability.

Still another object of the invention is to provide a wing construction giving maximum sustentation and a smooth gliding travel of the airplane in the air, while allowing quick take offs and landings at slow speed.

Still another object of the invention is to provide a novel construction and relative arrangement of the parts forming the supporting and stabilizing surfaces of the craft whereby resistance to flight is reduced and maximum general stability obtained.

Still another object of the invention is to provide a frame or fuselage embodying a novel construction and arrangement of parts which are mutually reinforced and braced so as to furnish a fuselage and machine structure as a whole which is light in weight but of greater strength and formed of a minimum number of parts.

Still another object of the invention is to provide a novel and simple construction of shock-absorbing landing gear which will readily ride without injury over ground irregularities or obstructions.

With these and other objects in view, which will appear in the course of the subjoined description, the invention consists of the features of construction, combination and arrangement of parts, hereinafter fully described and claimed, reference being had to the accompanying drawings, in which:

Fig. 1 is a top plan view of an airplane constructed in accordance with my invention, omitting the motor and propeller.

Fig. 2 is a side elevation thereof.

Fig. 3 is a perspective view showing the construction of the frame or fuselage.

Fig. 4 is a front elevation of the airplane.

Fig. 5 is a front perspective view on an enlarged scale showing more clearly the construction of the frame or fuselage.

Fig. 6 is a section on line 6—6 of Fig. 2.

Fig. 7 is a detail section on line 7—7 of Fig. 1.

Fig. 8 is a side view of a portion of the tail frame showing the mounting of the elevator, rudder and tail wheel.

Fig. 9 is a side view showing the construction of the landing gear.

Fig. 10 is a detail section on line 10—10 of Fig. 9.

Fig. 11 is a section on the line 11—11 of Fig. 8.

Referring now more particularly to the drawings, 1 designates the body or fuselage of my improved airplane which includes the main frame portion 2, tail frame portion 3, the engine bed portion 4 and the lifting tail frame structure 5, these parts being made of any light but strong structural materials and combined in such manner as to form a truss frame of great strength.

As shown, the frame comprises a pair of spaced upper longerons 6 and a pair of spaced lower longerons 7. These longerons are spaced by front and rear sets of vertical and horizontal struts, the front set consisting of vertical struts 8 and 9 and horizontal struts 10 and 11 and the rear set of vertical struts 12 and 13 and horizontal struts 14 and 15. These sets of struts and the portions of the longerons between them form the oblong rectangular panel-like main frame portion 2. These parts may be supplemented by suitable bracing if desired, but the use of such is not deemed necessary, as the arrangement of the parts of the frame as a whole gives the necessary trussing effect.

The lower longerons 7 have forward extensions 16 projecting in advance of the frame portion 2 and connected by a cross piece 17 with each other and by braces 18, arranged in inverted V-fashion, with the strut 9. The parts 16 and 17 form a strongly stayed engine bed on which the engine and propeller are mounted in practice. Between the sets of struts 8, 9, 10, 11, 12, 13, 14 and 15 the longerons 6 and 7 are equally spaced and arranged in parallel relation, so that this portion of the frame, i. e., the main portion, is of maximum width and depth. In rear of this portion 2, however, the longerons of each pair are arranged in V-fashion and converge uniformly toward the extreme rear end of the frame, and the pairs of longerons relatively converge with relation to each other, thus forming a tail portion 3 of rectangular cross section but tapering from the portion 2 to its extreme rear end. As shown, the lower longerons 7 are longitudinally straight from end to end and converge continuously toward their rear ends where they are connected together at the extreme rear end of the frame, while the longerons 6 not only converge rearwardly with relation to each other but are curved downwardly and rearwardly in rear of the main frame portion 2 so as to converge relatively to the longerons 7. The longerons 6 are also shorter than the longerons 7 and have their rear ends terminating at a point in advance of the rear ends of the longerons 7 and brought closely together and united to the forward end of an extension bar 19 which is fastened at its rear end to the rear ends of the longerons 7. The rear ends of the parts 6 and 7 are thus arranged to lie in a plane below the horizontal transverse center of the frame to provide for an advantageous mounting of the lifting tail 5, vertical rudder, elevator and tail skid.

The lifting tail frame structure 5 is of substantially truncate triangular form and comprises a short front horizontal transverse bar 20 extending between the longerons 7 and forming a bracing strut therebetween, a longer horizontal transverse bar 21 medially connected to the rear ends of the longerons 6 and 7 and projecting laterally at opposite sides thereof, and side bars 22 arranged on opposite sides of the longerons 7. These side bars 22 are connected at their forward ends to the longerons 7 and strut 20 and at their rear ends to the bar 21 and extend rearwardly in divergent relationship to each other, forming with the longerons 7 two triangular frames which are closed by a suitable fabric covering. A lifting tail of large area and high lifting capacity is thus provided which is arranged below the slip stream line of the propeller so that the slip stream pressure will strike its upper surface. This pressure tends to force the tail of the machine down and its head up so that the lifting tail will cooperate with the main plane to give greater longitudinal stability to the machine in normal flight and upon a relief of this pressure, if the engine stalls or if the engine power is cut off, there will be an automatic tendency toward diving and increased speed to prevent a machine stall. The bar 21 may form a pivotal support for the elevator or horizontal rudder 23 which may be of conventional form and construction except that it is designed to form a continuation of the tail plane when in normal position to increase the extent of lifting surface of the latter.

A vertical rudder post 24 fits at its lower end between the longerons 6 and is suitably fastened thereto and an inclined brace 25 is connected at its forward end to the strut 20 and extends upwardly and rearwardly between the struts 6 and is suitably fastened thereto, said brace being fastened at its rear end to the upper end of the post 24, whereby the latter is rigidly supported in position. To the post 24 is hinged or pivoted the rudder 26 comprising a frame covered by fabric or other suitable material. As shown, the space between the longerons 6 and brace 25 is covered by fabric or other suitable material to form a vertical stability fin 27. This fin and the rudder are of substantially triangular shape and are arranged, when the rudder is in normal position, in tracking relationship so that the area and effectiveness of the fin surface will be increased by coaction therewith of the rudder surface. The frame formation of these parts is obviously such that great strength is obtained with simplicity of construction and lightness in weight. The structure at the tail end of the machine is completed by the provision of a tail support and skid comprising an inclined resilient bar or tongue 28 carrying at its lower rear end a wheel 29 and extending at its forward end upwardly between the struts 7 and secured to the struts 6 at the point of connection of the brace 25 therewith whereby a strong and durable connection is effected and the brace 25 adapted to assist in sustaining the strains falling on the skid.

The machine is of monoplane type and provided with a main plane 30 having counterpart dihedrally angled wings 31 projecting laterally beyond opposite sides of the fuselage. These wings have the general outline form of the wings of a soaring bird so as to obtain a smooth gliding travel in flight and inherent as well as automatic aerodynamic stabilizing actions. As shown, each wing is formed of a front wing spar 32 having a rearwardly extending tip arm or staff 33, connected therewith by an inclined strut 34, brace rods 35 connecting the spar 32 with the fuselage, and a tension type of resilient or flexible tail rod, cable or strand 36, said elements constituting the frame of the wing, over which is stretched and to which is suitably secured a surface of a suitably strong and durable fabric 38. The wings so formed may have any suitable camber and be of any suitable span but are of maximum chord length at their butt ends or points of attachment to the fuselage and thence taper or are of progressively diminishing chord length toward their tips, this form of the wings being obtained by divergently inclining the trailing edges of the wings outwardly and forwardly from their points of attachment to the fuselage, as shown. The general effect of this construction is to give maximum wing surfaces at the inner portions of the wings tending to dampen and prevent instability in turbulent air and under strong side gusts on the dihedral surfaces which are inherently stable in still air and under moderate wind conditions. Inherent general stability is also secured by mounting the wings at the top of the fuselage and having the fuselage body depend below the same to give a low center of gravity and to adapt the fuselage body to oppose or counteract changes in position causing lateral or longitudinal stability. In practice the wing spars 32 may be continuous with each other and with the strut 10, as shown, and have a desired degree of resiliency for up and down and axial twisting movements. These movements are restricted or reduced to a minimum degree by the braces 35 with regard to the inner end portions of the spar between the fuselage and points of attachment of the braces 35 to the spar, so that such portions of the spar are comparatively rigid, but the outer end portions of the wing spars from said points of attachment to their tips are free to bend or flex and axially twist upon themselves and the tip staffs 33 are adapted to move therewith. It will be observed that in the construction shown the wings are void of ribs or other connections between the spars 32 and rods 36 except the tip staffs 33 and wing fabric 38 so that each wing is essentially flexible, to degrees determined by the flexibility of the spar 32 and rod 36, to flex upon itself for automatic stabilizing and wind shedding actions. Under excess pressures falling on a wing tip, for example, the tip will bend or flex under force of the pressure and warp upon itself to shed the pressure or effect a washout action, so that the disturbing force will be dissipated. Similarly the wings may constantly flex at their trailing edges and to change their fore and aft contour or camber to release excess pressures, or the wings may flex helicoidally upon themselves for washout actions, thus shedding the disturbing forces like the wings of a bird and maintaining lateral stability of the machine without the use of ailerons. These actions also render the machine inherently longitudinally stable to a large extent, but any tendency to longitudinal instability may be corrected by use of the elevator. In banking also the flexible wing tips automatically take proper positions to properly bank the machine and prevent side skidding, while the construction of the wing and tail surfaces act in the event of stalling of the engine or cutting down of the engine power to cause the machine to assume a gliding angle of a degree for gliding travel at a speed sufficient to prevent stalling. The large area of wing surface provided by this machine, at maximum wing camber, allows take off at comparatively low speed, while the tendency of the flexible wings to be depressed at their trailing edges when the machine is nosed down for a landing causes the wings to act as wind brakes allowing landings to be made at a low and safe speed. While ailerons are not shown and essentially not required, they may be used, if desired, and if desired, also, the wings may be provided with ribs, provided the ribs allow wing flexing and warping actions of the character described. Any suitable control means for operating the elevator and rudder may also be employed.

The wing fabric 38 may be held normally taut by the resiliency of the spar 32 and tension rod 36 so that when the machine is on the ground and in a standing attitude the wings, while arranged at a suitable angle of attack, will be substantially flat. When, however, the machine is put in motion the air pressure striking the reaction surfaces of the wings will cause the fabric 38 to balloon to a certain degree upward to give a certain degree of camber or fore and aft curvature and a certain degree of longitudinal curvature to the wings, thus placing the spar and tension rod under high tension and imparting to the wings the curvature of a soaring bird's wings when in soaring attitude. Maximum lifting power on the wings is thus established for a take off at low speed and for maximum sustentation when the machine is in the air. Because of this ballooning effect, there is, when the machine is in flight, a cushioning layer of air retained beneath the wing, enough, as with a soaring bird's wing, to cushion the wing against shocks and to give a smooth gliding effect in flight, but not enough to prevent aerodynamic reactions or to cause drag, all accumulated excess air or pressures beyond that required for sustaining and cushioning actions being spilled off by the flexing actions of the wings in simulation as far as possible of the air shedding actions of the soaring bird's wing. The tension effect is reduced as the machine speed is decreased and the machine is nosed down for a landing, but the spilling or washout action is also decreased so that when the machine is brought to a final landing attitude sufficient air will be banked under the wings to form a wind brake allowing landing of the machine at a low speed. At high speeds and high wind pressures the wing curvature is small, as high speed with a small wing curvature will give necessary sustentation and reduce air resistance, but at low speeds and low wind pressures the resilience of the wing and its tips will increase the curvature to retain air to secure sustentation, thus tending to give uniform buoyancy under varying speed and wind conditions.

The frame structure is provided with a covering or sheathing A of fabric, plywood or other suitable material to give a streamline form thereto, and the frame part 2 may be constructed to form a cockpit or compartment for the occupancy of an aviator or pilot and the forward part of the frame portion 3 may likewise be constructed to provide a cockpit or compartment for a passenger or storage space for baggage or equipment to be carried.

I provide a novel type of landing gear for the machine which comprises a pair of spaced parallel independent wheel carriers 40 having beveled or rounded nose portions 41 connected by outwardly, downwardly and rearwardly inclined front suspension rods 42 pivoted or suitably jointed, as at 43, at their upper ends to the projecting ends of the truss bar 17 so as to have swinging movements in an upward and rearward direction. At their rear ends the wheel carriers are pivoted, as at 44, to the lower ends of rear suspension rods 45 which are yieldingly connected at their upper ends by shock absorbers 46 to the braced portions of the wing spar 32. These shock absorbers may be of cylinder, piston and spring type, hydraulic type, cushioned rubber type or of any other suitable type. This construction provides a very light, but strong and durable construction of shock absorbing landing gear which is so positioned as to allow a landing action at even a high angle without danger of the machine nosing over. Also it will be seen that each wheel is mounted as to readily ride without injury over ground irregularities or obstructions of considerable height, even above the axle of the wheel, as in every case the nose portion 41 or inclined rods 42 of either wheel carriage on striking an obstruction will swing rearwardly and upwardly and allow the wheel to ride over the obstruction without damage thereto or causing the machine to nose over.

From the foregoing description, taken in connection with the drawings, the construction, mode of operation and advantages of my improved airplane will be understood and appreciated by those versed in the art without a further and extended description, and it will be seen that the invention provides an airplane structure which effectually obtains the objects set forth. While the structure shown is preferred, it will, of course, be understood that changes in the form, proportion and arrangement of parts may be made, within the scope of the appended claims, without departing from the spirit or sacrificing any of the advantages of the invention.

What I claim is:

1. A flying machine comprising a body, and a flexible wing at each side of the body arranged at a predetermined angle with relation to the body, said wing being of maximum chord length at its inner end adjacent to the body and of progressively diminishing chord length toward its free end, each wing including a front wing spar connected at its inner end to the body, a brace connecting the spar intermediate its length to the body so as to render the inner end portion of the spar between the body and such point of connection of the spar with the brace substantially rigid and resistant to upward and downward movements with relation to the body and to axial twisting movements upon itself while allowing the outer end portion of the spar beyond such point of connection of the spar and brace to flex and move upward and downward from a normal position relative to the body and to have axial twisting movements upon itself, a warping arm connected to the outer extremity of the flexible outer portion of the spar and bodily movable upwardly and downwardly therewith and angularly movable relative thereto to axially twist said flexible portion of the spar, a universally flexible tension member arranged in rear of the spar between the body and warping arm, and a flexible wing covering attached to the spar, warping arm and tension member and normally held thereby in a substantially flat state but with freedom to belly upward under wind pressures from below when the machine is in flight so as to assume the shape of an airfoil curved between its leading and trailing edges to present a concaved reaction surface and a convex rarefaction surface, said covering being flexible under varying wind pressures to vary its fore and aft curvature and being bodily movable upwardly and downwardly with the arm and flexible portion of the spar to vary the angular relationship of the wing with respect to the body and further being warpable helicoidally upon itself under angular movements of the arm and twisting movements of the spar.

2. In a flying machine, a body, and a wing at each side of the body comprising a front wing spar having an inner portion connected at its inner end to the body and at a point between its inner end and transfer center to the body so as to be held fixed and substantially rigid with the body against upward or downward movements relative to the body and against axial twisting movements upon itself and having an outer portion beyond its second-named point of connection with the body which is free to flex and to move upwardly and downwardly from a normal position with relation to the body and to be axially twistable upon itself, a warping arm connected to the outer extremity of the flexible outer portion of the spar and bodily movable upwardly and downwardly therewith and angularly movable relative thereto to axially twist said flexible portion of the spar, a universally flexible tension member arranged in rear of the spar between the body and warping arm, and a flexible wing covering attached to the spar, warping arm and tension member and normally held thereby in a substantially flat state but with freedom to belly upward under wind pressures from below when the machine is in flight so as to assume the shape of an airfoil curved between its leading and trailing edges to present a concaved reaction surface and a convex rarefaction surface, said covering being flexible under varying wind pressures to vary its fore and aft curvature and being bodily movable upwardly and downwardly with the arm and flexible portion of the spar under varying wind pressure and warpable helicoidally under angular movements of the arm and twisting movements of the spar.

3. A flying machine comprising a body, and a flexible wing at each side of the body normally arranged at a dihedral angle to the body, said wing being of maximum chord length at its inner end adjacent to the body and of progressively diminishing chord length toward its free end, each wing including a front wing spar connected at its inner end to the body, a brace connecting the spar intermediate its length to the body at a point in rear of the point of connection of its inner end to the body so as to render the inner end portion of the spar between the body and such point of connection of the spar with the brace substantially rigid and resistant to upward and downward movements with relation to the body and to axial twisting movements upon itself while allowing the outer end portion of the spar beyond its second-named point of connection with the body to flex and move upward and downward from a normal position relative to the body and to have axial twisting movements upon itself a universally flexible tension member arranged in rear of the spar between the body and warping arm, and a flexible wing covering attached to the spar, warping arm and tension member and normally held thereby in a substantially flat state but with freedom to belly upward under wind pressures from below when the machine is in flight so as to assume the shape of an airfoil curved between its leading and trailing edges to present a concaved reaction surface and a convex rarefaction surface, said covering being flexible under varying wind pressures to vary its fore and aft curvature and being bodily movable upwardly and downwardly with the arm and flexible portion of the spar to vary the angular relationship of the wing with respect to the body and further being warpable helicoidally upon itself under angular movements of the arm and twisting movements of the spar.

4. In a flying machine, a fuselage comprising upper spaced longerons and lower spaced longerons, front and rear sets of vertical and horizontal struts connecting said longerons and forming therewith a paneled portion at the front part of the fuselage, said lower longerons having extensions projecting forwardly beyond the paneled portion, a cross piece connecting the forward extensions of the lower longerons and forming therewith an engine bed located in advance of the paneled portion, a supporting surface including a front wing spar fixed to the forward ends of the upper longerons and extending laterally beyond each side of the fuselage, and a landing gear comprising spaced parallel, horizontal longitudinally extending wheel carriers arranged below the forward extensions of the lower longerons and in rear of the cross piece and having upwardly and forwardly inclined nose portions, wheels journaled on the carriers to rotate on axes lying above the level of the nose portions and so that portions of the peripheries of the wheels project to major and minor degrees respectively above and below horizontal plane of the carriers, front suspending members connected at their lower ends to the inclined nose portions of the carriers and extending in front of the wheels at an upward and forward angle of inclination toward and pivotally connected at their upper ends to the ends of the crosspiece, rear suspending members connected at their lower ends to the carriers in rear of the wheels and extending upwardly therefrom, and shock absorbing means connecting the upper ends of the rear suspending members to the laterally extending portions of the front wing spar.

5. In a flying machine, a fuselage comprising a pair of upper longerons and a pair of lower longerons, a front set of vertical and horizontal transverse struts connecting said longerons at their forward ends, a second set of vertical and horizontal transverse struts connecting said longerons at a point in rear of the first-named struts and coacting therewith and with the portions of the longerons therebetween to form a paneled main frame portion, said lower longerons extending rearwardly beyond the paneled portion substantially in the plane of the bottom of the paneled portion and in converging relation and terminating at their rear ends in close proximity to each other, and said upper longerons extending downwardly and rearwardly beyond the paneled portion on a curved line and in converging relation and terminating at their rear ends in close proximity to each other at a point in advance of the rear ends of the lower longerons, and a longitudinal truss member fitted between and connected with the rear ends of the upper longerons and extending rearwardly therefrom and fitted between and connected with the rear ends of the lower longerons.

6. In a flying machine, a fuselage comprising a pair of spaced upper longerons, a pair of spaced lower longerons, a front set of vertical and horizontal transverse struts connecting the upper and lower longerons at their forward ends, a second set of vertical and horizontal transverse struts connecting said upper and lower longerons at a point in rear of the first-named struts and coacting therewith and with the portions of the longerons therebetween to form a paneled main frame portion, said lower longerons extending rearwardly beyond the paneled portion substantially straight line substantially in the plane of the bottom of the paneled portion and in converging relation and terminating at their rear ends in close proximity to each other, and said upper longerons extending downwardly and rearwardly beyond the paneled portion on a curved line and in converging relation and terminating at their rear ends in close proximity to each other at a point in advance of the rear ends of the lower longerons, a horizontal transverse truss member connecting the lower longerons adjacent their rear ends, a longitudinal truss member fitted between and connected with the rear ends of the upper longerons and extending rearwardly therefrom and fitted between and connected with the rear ends of the lower longerons, a rudder post projecting upward from the longitudinal truss member, and a brace connecting said post with said horizontal transverse truss member and said longitudinal truss.

7. In an airplane, a frame having pairs of lower longerons and upper longerons relatively converging at their rear ends, the converging rear ends of the upper longerons terminating in advance of the converging ends of the lower longerons, a longitudinal truss member fitted between and fixed to the rear ends of the lower longerons and extending forwardly therefrom and fitted between and fixed to the rear ends of the upper longerons, a rudder, a rudder supporting post fixed to and projecting upward from the rear ends of the lower longerons, a tail frame structure including a rear transverse member and side members, said rear transverse member being centrally secured to the rear ends of the lower longerons and said side members being secured to and extending convergently forward from the ends of said rear member and secured at points in advance of the rudder post to the lower longerons, a cross strut connecting the lower longerons adjacent to and in advance of the rear extremities of the upper longerons, and an inclined brace extending through the longitudinal strut at its point of connection with the rear ends of the upper longerons and connecting the cross strut with the rudder supporting post and forming with the latter a fin frame.

8. In an airplane, a fuselage comprising upper longerons and lower longerons, the lower longerons having forward portions projecting beyond the forward portions of the upper longerons to provide an engine bed, a front wing spar fixed to the forward portions of the upper longerons, a cross piece connecting the forward portions of the lower longerons, and a landing gear structure at each side of the forward portion of the fuselage comprising a carriage having an upward and forwardly beveled or inclined nose portion, a wheel journaled on the carriage in rear of said nose portion, a front suspension rod connected at its lower end to said nose portion and forming a fender in front of the wheel extending at an upward and forward angle of inclination from the nose portion and pivotally connected at its upper end to said cross-piece at the adjacent side of the fuselage, a rear suspension rod pivotally connected at its lower end to the rear end of the carriage and extending upwardly therefrom, and a shock absorber carried by the wing spar and yieldingly connecting the upper end of the rear suspension rod therewith.

EDWIN P. S. NEWMAN.